June 9, 1964

C. E. JOSLIN 3,136,106

MOWER

Filed March 20, 1961

INVENTOR.
CARLOS E. JOSLIN
BY
Schmieding and Fritz
ATTORNEYS

INVENTOR.
CARLOS E. JOSLIN
BY
Schmieding and Fultz
ATTORNEYS
United States Patent Office 3,136,106
Patented June 9, 1964

3,136,106
MOWER
Carlos Earl Joslin, Mount Sterling, Ohio
Filed Mar. 20, 1961, Ser. No. 97,006
6 Claims. (Cl. 56—25.4)

This invention relates to power driven mowers for cutting grass, weeds, and the like.

In general, the mower of the present invention includes a main frame, which may be in the form of a conventional tractor, and an auxiliary sub-frame having longitudinally extending side members that are pivotally mounted to the main frame. A cutter housing is pivotally attached to the two longitudinally extending members and carries a plurality of cutter blades.

As one aspect of the present invention the cutter housing is free to float vertically about a laterally extending axis established by pivotal connections between the longitudinally extending frame members and the main frame and between the cutter housing and the longitudinally extending members.

As another aspect of the present invention the cutter housing includes flexibility about a longitudinally extending axis since it is formed of right and left cutter housing portions joined together at a central longitudinally extending hinge.

As still another aspect of the present invention, the mower frame construction provides, in a unique manner, a mower having relatively low central heighth whereby it can be mounted to and under conventional tractors having relatively small clearance between the bottoms of the tractor frames and the ground. Examples of such tractors are the Ford and Ferguson types well known to the art.

It is therefore an object of the present invention to provide an improved mower that includes a pivotally mounted auxiliary frame and cutter housing that are flexibly mounted in a unique and simple manner such that the mower can follow variations in the contour of the ground.

It is another object of the present invention to provide an improved mower that includes a cutter housing means that is flexibly mounted to a supporting frame for pivotal movement about a laterally extending axis, said cutter means including separate pivotally connected housing portions that are flexible about a longitudinally extending axis.

It is still another object of the present invention to provide an improved mower having a novel frame configuration of low central heighth that uniquely adapts the mower for attachment to and under conventional tractors having a relatively small amount of ground clearance.

It is still another object of the present invention to provide an improved mower that includes a belt drive having unique means for adjustably tightening the belts.

Further objects and advantages of the present invention will be apparent from the following description, reference being had to the accompanying drawings wherein a preferred form of embodiment of the invention is clearly shown.

In the drawings:

FIG. 4 is a partial view of the belt tightening means comprising a portion of the apparatus of preceding figures.

Figure 1:
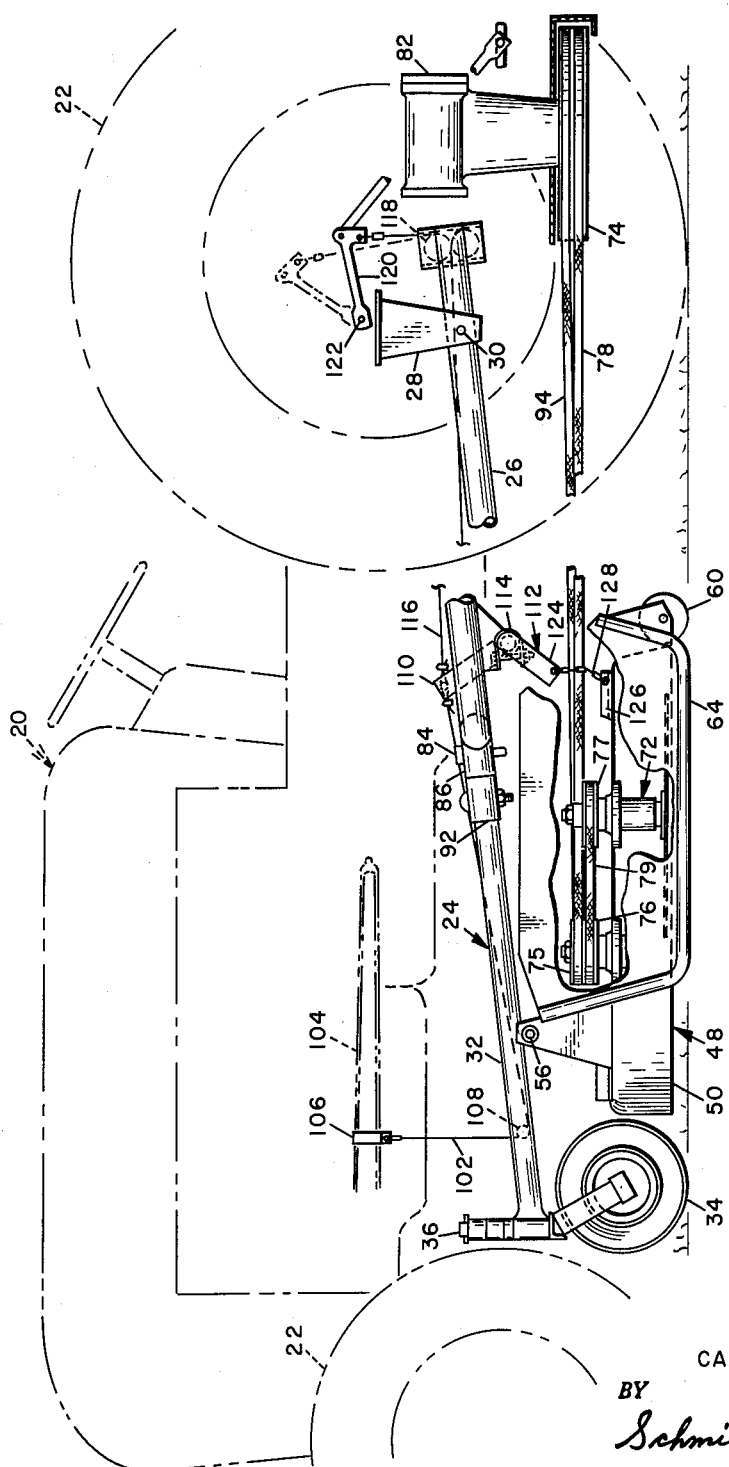
FIG. 1 is a side elevational view of a mower constructed in accordance with the present invention.
Figure 2:
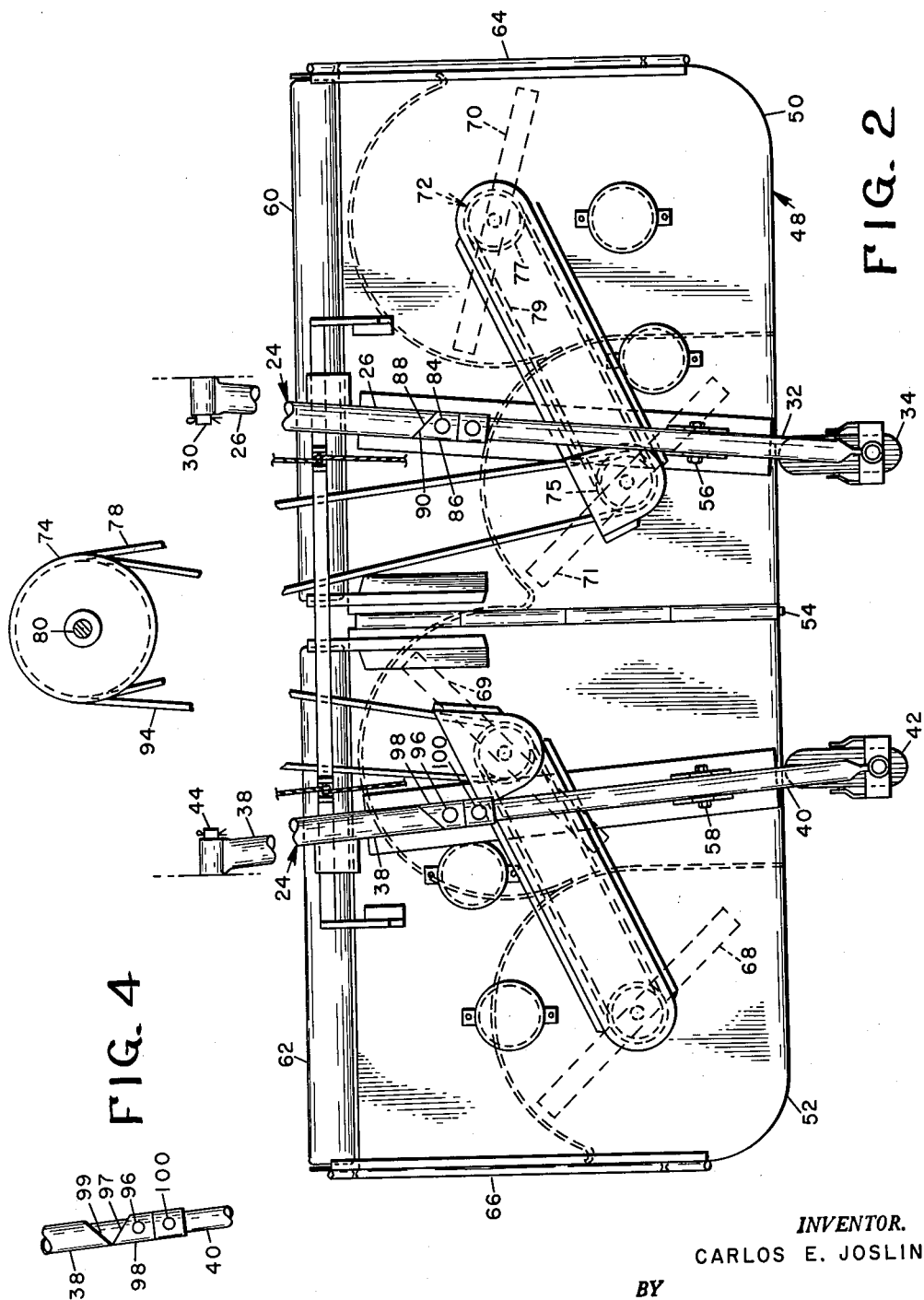
FIG. 2 is a top elevational view of the mower of FIG. 1.
Figure 3:
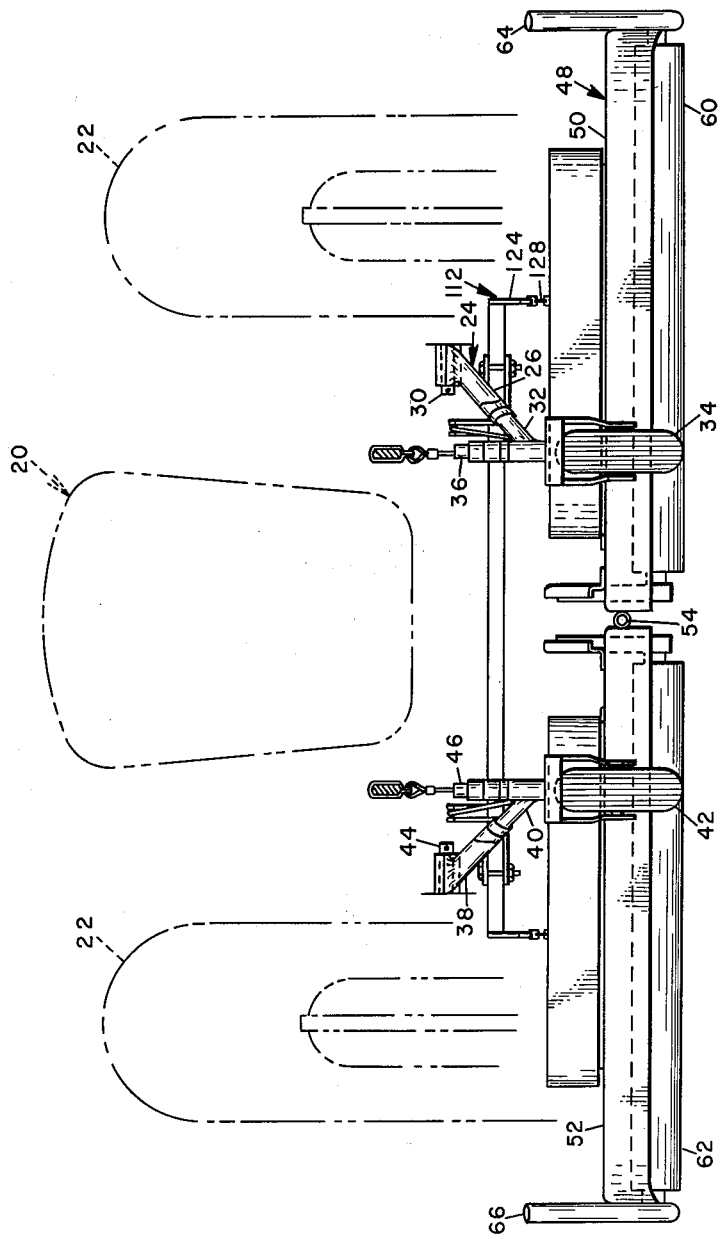
FIG. 3 is a front elevational view of the mower of FIG. 1.

Referring in detail to the drawings, FIGS. 1-3 illustrate a mower constructed in accordance with the present invention that includes a main frame 20 that may be in the form of a tractor having front and rear supporting wheels 22.

The mower includes an auxiliary frame means indicated generally at 24 that consists of a first left longitudinally extending member 26 that is pivotally mounted to a bracket 28 on frame 20 at a pivot 30.

A second left longitudinally extending member 32 is slidably mounted in telescoping relationship with first left frame member 26. The front portion of left member 32 is supported by a caster wheel 34, said wheel being pivotally movable about a vertically extending pivot 36.

The right side of the machine is provided with an identical assembly that includes a first right longitudinally extending member 38, a second right longitudinally extending member 40, a caster wheel 42, and pivotal connections 44 and 46.

A cutter housing means is indicated generally at 48 and includes a left housing portion 50 and a right housing portion 52 hinged together at a central longitudinally extending hinge pivot 54. Left housing portion 50 is mounted to left frame member 32 at a laterally extending pivot 56. Right housing portion 52 is mounted to right frame member 40 at a laterally extending pivot 58.

Suitable ground engaging means, such as the rollers 60 and 62, support the rear ends of housing portions 52 and 50 respectively. The housing means 50 and 52 are further supported by outboard supporting means 64 and 66 which may be in the form of skids, runners, or wheels.

With reference to FIG. 2, housing means 48 supports a plurality of cutter blades 68, 69, 70, and 71, each of which is mounted on a vertically disposed shaft and bearing assembly indicated generally at 72 in FIGS. 1 and 2.

With reference to FIGS. 1 and 2, the cutting blades 70 and 71 on the left side of the machine are driven via pulleys 74, 75, 76, and 77 which carry belts 78 and 79. Similarly, the right cutting blades 68 and 69 are driven by a like assembly of pulleys and belts. The main drive pulley 74 is mounted on a drive shaft 80 that extends downwardly from a conventional stationary gear box 82 mounted on the main frame or tractor 20.

Referring next to FIGS. 1, 2, and 4, right belt 94 is tightened by extending right frame member 40 relative to left frame member 38. This is accomplished by removing a locking pin 96 from aligned holes in a collar 98 and frame member 40. Afater pin 96 is removed collar 98 is rotated through 180 degrees about frame 40 whereby a cam surface 97 on collar 98 is shifted relative to a cam surface 99 on frame member 38. This produces wedging action between a stationary collar 100 mounted on frame member 40 and frame member 38 whereby frame member 40 is shifted longitudinally relative to frame member 38 from the position of FIG. 1 to the position of FIG. 4.

The left belt 78 is tightened in the same manner by removing a pin 84 from a moveable collar 86 and by rotating the collar to produce wedging action between a stationary collar on left frame member 32 and left frame member 26.

With reference to FIG. 1 the front end of auxiliary frame means 24 is raised and lowered relative to main frame 20 by a cable 102 having an end attached to a main frame member 104 at a bracket 106. Cable 102 extends around a pulley 108 and is connected to an arm 110 of a bell crank indicated generally at 112, said bell crank being pivotally mounted on an anuxiliary frame means 24 at a pivot 114.

With continued reference to FIG. 1, a second cable 116 is connected to arm 110 of the bell crank and extends around a pulley 118 mounted on frame member 26. The rear end of cable 116 is attached to an arm 120 of an actuating linkage pivoted to main frame 20 of the tractor at a pivot 122.

Bell crank 112 includes a second arm 124 that is connected to a bracket 126 on the rear of cutter housing 50 by means of a chain 128.

In operation, as the mower moves across the ground, caster wheels 34 and 42 follow the contour and raise the front ends cutter housing means 50 and 52 as required to cause the cutter blades to follow the ground contour. As the caster wheels 34 and 42 move upwardly and downwardly relative to rollers 60 and 62, it will be understood that housing portions 50 and 52 pivot about the lateral axis formed by pivots 56 and 58.

When one of the outboard supports such as left support 64 encounters a high or low spot the left housing portion 50 will pivot relative to right housing portion 52 about a longitudinally extending axis formed by hinge pivot 54. A corresponding pivotal action occurs when right outboard support 66 encounters a high or low stretch of ground.

It should be pointed out that such pivotal action about longitudinally extending hinge pivot 54 can occur between the housing portions 50 and 52 since the front frame members 32 and 40 are rotatably mounted in respective rear frame members 26 and 38.

When the operator desires to turn the machine, or for any reason lift the cutters, auxiliary frame 24, including caster wheels 34 and 42 and rollers 60 and 62, are lifted from the ground by actuating arm 120 to take up cables 102 and 116. When cables 102 and 116 are drawn in bell crank 112 it is actuated about pivot 114 whereby chain 128 lifts rollers 60 and 62. When cables 102 and 116 are slack, however, chain 128 is also slack whereby rollers 60 and 62 can follow the contour of the ground.

While the form of embodiment of the present invention as herein disclosed constitutes a preferred form, it is to be understood that other forms might be adopted, all coming within the scope of the claims which follow.

I claim:

1. A mower comprising, in combination, a main frame; supporting wheels mounted to said main frame; auxiliary frame means including a right longitudinally extending frame portion having a rear member pivotally attached to the right side of said main frame and a front member, one of said members forming a plug element rotatably disposed in a socket portion formed by the other of said members for rotation about a longitudinal axis; a left longitudinally extending frame member including a rear portion pivotally attached to said main frame and a front member, one of said members forming a plug element rotatably disposed in a socket portion formed by the other of said members for rotation about a longitudinal axis; a right caster wheel pivotally attached to said front member of said right longitudinally extending frame portion; a left caster wheel pivotally attached to said front member of said left longitudinally extending frame portion; cutter housing means; means forming a right pivotal connection between said front member of said right longitudinally extending frame portion and the right side of said housing means for pivotal movement of said housing means about a laterally extending axis; means forming a left pivotal connection between said front member of said left longitudinally extending frame portion and the right side of said housing means for pivotal movement of said housing means about a laterally extending axis; a ground engaging member mounted on the rear portion of said cutter housing means; cutter means rotatably mounted on said cutter housing means; and driving means for said cutter means.

2. A mower comprising, in combination, a main frame; supporting wheels mounted to said main frame; a right longitudinally extending auxiliary frame portion including a first right frame member pivotally attached to said main frame and a second right frame member rotatably supported by said first right frame member for rotation about a longitudinally extending axis; a left longitudinally extending auxiliary frame portion including a first left frame member pivotally attached to said main frame and a second left frame member rotatably supported by said first left frame member for rotation about a longitudinally extending axis; a right caster wheel including a vertically extending pivotal connection with said second right frame member; a left caster wheel having a vertically extending connection with said second left frame member; right and left cutter housings connected together at an intermediate longitudinally extending pivotal connection; a right pivotal connection between said right cutter housing and said second right frame member for pivoting of said right cutter housing about a laterally extending axis; a left pivotal connection between said right cutter housing and said second left frame member for pivoting of said left cutter housing about a laterally extending axis; a right ground engaging member on the rear of said right cutter housing; a left ground engaging member on the rear of said left cutter housing; right blade means rotatably mounted on said right cutter housing; left blade means rotatably mounted on said left cutter housing; and driving means for said cutter means.

3. The apparatus defined in claim 2 wherein said second right frame member is longitudinally extendable relative to said first right frame member and wherein said second left frame member is longitudinally extendable relative to said first left frame member; a right latching means for locking said right frame members in extending relationship; and a second latching means for locking said left frame members in extended relationship.

4. The apparatus defined in claim 2 wherein said driving means includes a driving pulley rotatably carried by said frame, a driven pulley rotatably carried by said cutter means, and a belt connecting said pulleys; and means for longitudinally extending one of said second frame members relative to its respective first frame member for tightening said belt on said pulleys.

5. The apparatus defined in claim 1 that includes means for raising said front members of said right and left longitudinally extending frame portions relative to said main frame.

6. The apparatus defined in claim 2 that includes means for raising said second members of said right and left longitudinally extending frame portions relative to said main frame.

References Cited in the file of this patent

UNITED STATES PATENTS

| | | |
|---|---|---|
| 2,949,004 | Jones | Aug. 16, 1960 |
| 2,952,961 | Engler | Sept. 20, 1960 |
| 2,972,850 | Ariens et al. | Feb. 28, 1961 |